United States Patent

[11] 3,633,417

| [72] | Inventor | Albert Montague<br>2925 West 5th St., Brooklyn, N.Y. 11224 |
|---|---|---|
| [21] | Appl. No. | 7,748 |
| [22] | Filed | Feb. 2, 1970 |
| [45] | Patented | Jan. 11, 1972 |

[54] REMOVABLE SEWER CONDUIT FLOWMETER
6 Claims, 6 Drawing Figs.

[52] U.S. Cl.................................................. 73/231 R,
73/194 R, 73/215
[51] Int. Cl.................................................. G01f 1/06
[50] Field of Search........................................ 73/194,
215, 216, 229, 230, 231

[56] References Cited
UNITED STATES PATENTS

| 997,553 | 7/1911 | Hill............................... | 73/231 |
| 1,279,232 | 9/1918 | Binckley....................... | 73/231 |
| 1,124,144 | 1/1915 | King............................. | 73/231 X |
| 1,241,814 | 10/1917 | Binckley....................... | 73/231 |
| 2,283,906 | 5/1942 | Bennett......................... | 73/215 |

*Primary Examiner*—Richard C. Queisser
*Assistant Examiner*—C. E. Snee, III
*Attorney*—Amster & Rothstein ABSTRACT: A construction is described for insertion to the invert of a sewer conduit system or the like in order to determine the rate of flow in that system. The device includes a flow tube apparatus which may be permanently inserted to the sewer system and which converts open channel flow of the system into full pipe flow for greater accuracy in measurement of the flow rate. Also included in the construction is a metering apparatus which may be lowered into the flow tube apparatus when a measurement is desired.

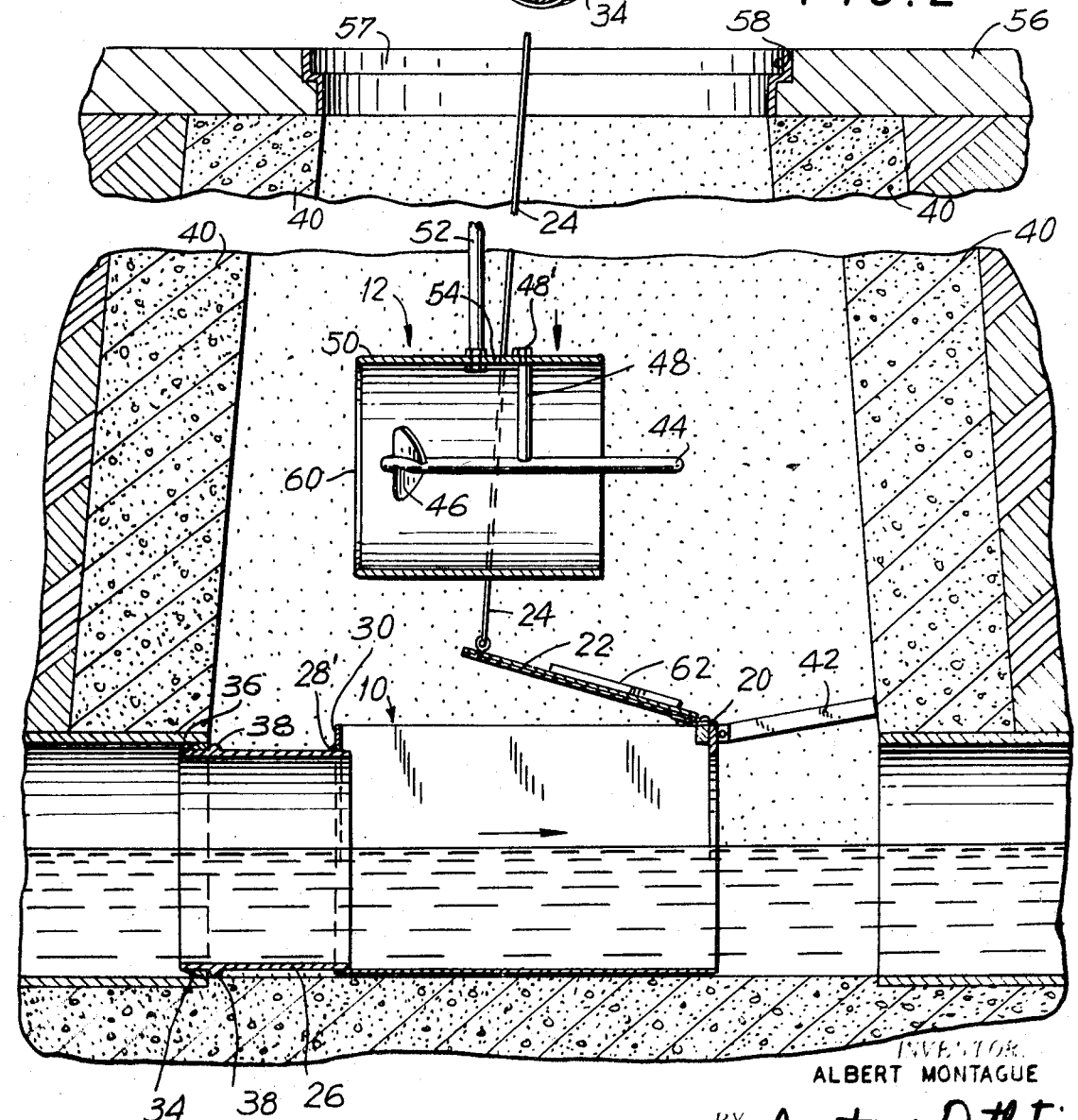

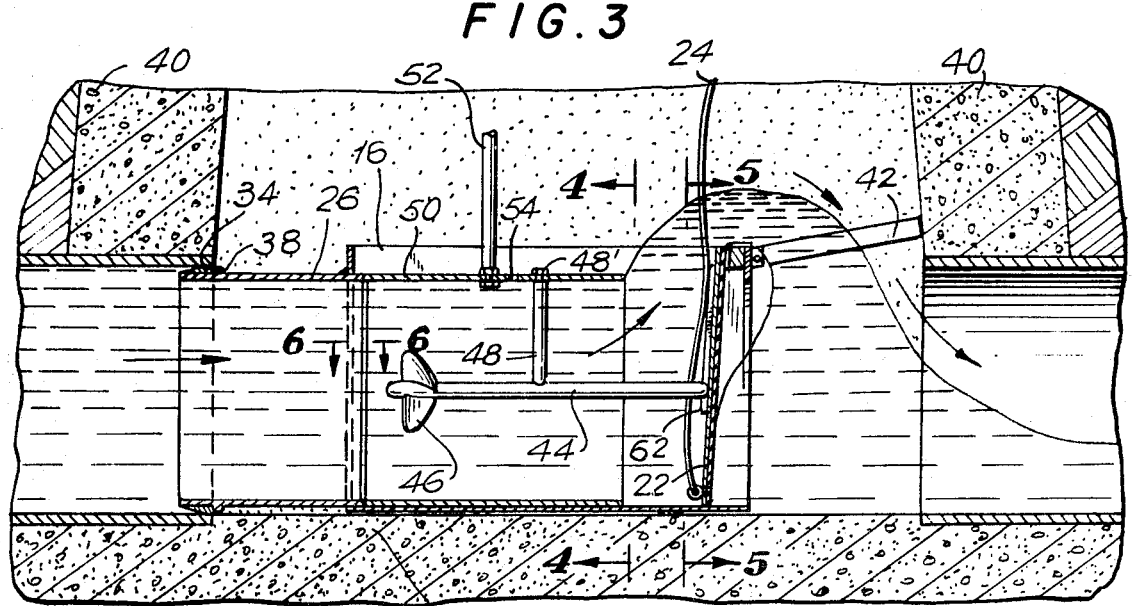
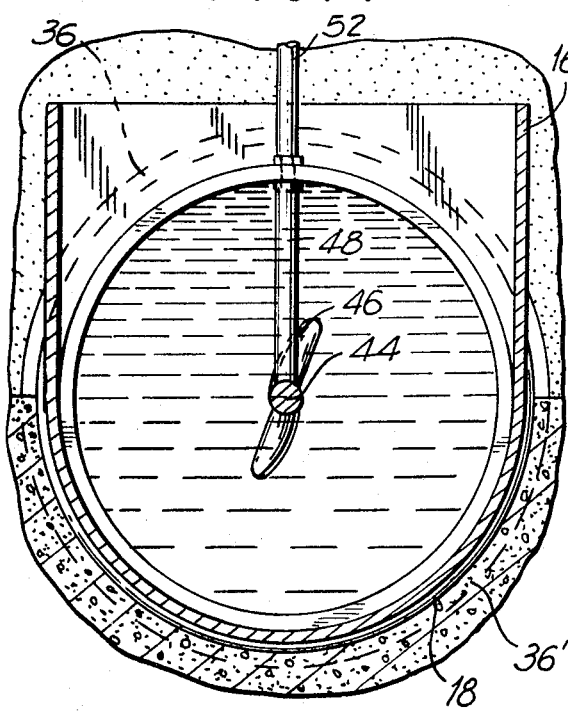
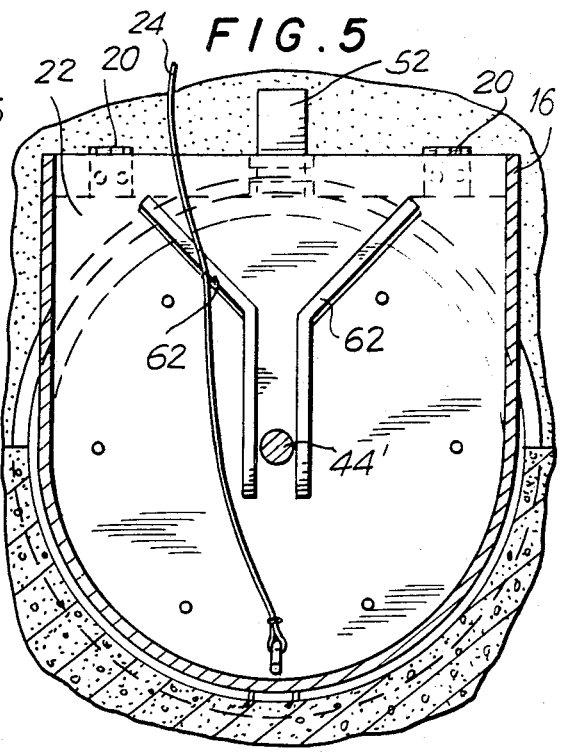
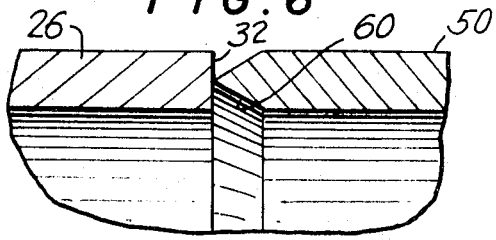

REMOVABLE SEWER CONDUIT FLOWMETER

This invention relates primarily to measuring devices and more particularly to flow-measuring devices particularly useful in sewer or other fluid conduit systems.

In present day flow rate metering systems and devices, it is sometimes necessary to interrupt the flow for the purpose of making a flow rate measurement. Also, it is necessary, particularly in a sewer system, for a person to actually lower himself through a manhole or the like into the conduit system with a device to accomplish the measurement. In the usual case, the measurement is taken during open channel flow, and is therefore somewhat inaccurate. Furthermore, such devices are usually affected in accuracy by the grade of the sewer, the velocity of flow and surcharging. External power or compressed air is usually necessary for operating the device which accomplishes the measurement.

Accordingly, a primary object of the present invention is to provide a flow rate metering device for accomplishing flow rate measurement in a sewer so that such measurement is accomplished in a rapid and easy manner.

A further object of the present invention is to provide such a device without the necessity for external power or compressed air.

A still further object of the present invention is to provide an accurate and reliable flow rate meter for a sewer without the necessity for any adjustments of physical modifications of the sewer conduit system.

In accordance with an illustrative embodiment demonstrating objects and features of the present invention, there is provided a flow tube apparatus which is readily insertable and adaptable to a conventional sewer conduit construction in the conduit "invert" between benches at manhole locations or stations. The flow tube apparatus is constructed to define at one of its ends an opening for which there is provided an end wall gate normally in nonobstructing position relative to the flow in the sewer conduit system. The gate position is controlled by a suitable control means from a position at the manhole cover above the site for the flow tube apparatus in the sewer conduit system. The gate is used to change open channel flow in the conduit to full pipe flow and further provides in its construction a guide for the insertion in the flow tube apparatus of a metering apparatus which is lowered into the flow tube apparatus by the operator for the purpose of taking the measurement of the flow. The metering apparatus includes an impeller rotatable about an axis parallel to the direction of flow and a means cooperating therewith for measuring the velocity of rotation of the impeller. The rate of flow is determined by measuring the flow or velocity of flow while knowing the cross-sectional area thereof and therefore the total volume of waste water per unit of time passing through the sewer station can be obtained.

The above brief description, as well as further objects, features and advantages of the present invention, will be more fully appreciated by reference to the following detailed description of a presently preferred, but nonetheless illustrative embodiment in accordance with the invention, when taken in conjunction with the accompanying drawings, wherein:

FIG. 1 is a front perspective view of a flow tube apparatus and a metering apparatus insertable thereto according to the present invention;

FIG. 2 is a side sectional view of a sewer "invert" with a flow tube apparatus in place therein and with a metering apparatus according to the present invention being lowered for insertion to said flow tube apparatus;

FIG. 3 is a side sectional view of the flow tube apparatus and metering apparatus in flow-measuring position in the sewer channel "invert."

FIG. 4 is a front sectional view taken along the line 4—4 of FIG. 3 in the direction of the arrows showing particularly the impeller of the metering apparatus;

FIG. 5 is a back sectional view taken along the line 5—5 of FIG. 3 and showing particularly the gate for the flow tube apparatus and its control means; and FIG. 6 is a partial top sectional view of the intersection of the front end of the flow tube apparatus and the metering apparatus.

Referring to the drawings and in particular FIG. 1, a flow meter construction is shown in disassembled view as including a flow tube apparatus generally designated 10 and a metering apparatus generally designated 12. The flow tube apparatus 10 includes a full pipe flow section 14 having a generally square upper-half portion 16 with generally vertical sidewalls, a generally semicylindrical lower-half section 18 matable with an invert found below a manhole station in a sewer system and an end wall gate 22 rotatably attached by suitable attachment means 20 to the upper part of the end of the full flow section 14. The end wall gate 22 is rotatable about an axis transverse to the direction of flow through the full flow section 14 so that full pipe flow occurs in the full flow section 14 when the end wall gate 22 is in its end wall position and open channel flow occurs in the full section 14 when the end wall gate 22 is rotated about its axis by use of suitable lifting means 24 to a position generally unobstructing to the flow of fluid through the flow tube apparatus 10.

The end of the full flow section 14 opposite to that having end wall gate 22 is constructed to receive a generally cylindrical member 26 which protrudes through an opening 28 defined by end wall 30 of the full flow section 14. The cylindrical member 28 is affixed to the full flow section 14 by welding 28' or the like. The end 32 of the cylindrical member 26 which protrudes into the full flow section 14 is constructed to define, as accurately as possible, a true square edge surface in order to provide a fluid seal with the metering apparatus 12. The other end of the cylindrical member 26 is provided with a tapered neoprene or rubber slip-on gasket 34 for providing a fluid seal with the permanent sewer conduit 36 (FIG. 2). A circumferential ring stop 38 (FIG. 2) is used to hold the gasket 34 in sealing position with respect to the permanent sewer conduit 36. The entire flow tube apparatus 10, as seen most clearly in FIGS. 2, 3, and 4, is intended for disposition in a sewer invert defined by the lower-half of the permanent sewer conduit 36 and the manhole housing 40. It may be seen, particularly in FIG. 2, that the flow tube apparatus 10 is wedged into sealing position by use of stiffener member 42 attached to the flow tube apparatus 10 at its end nearest the rotatable end wall gate 22.

The metering apparatus 12, shown in FIG. 1, is constructed to include an axially located impeller shaft 44 having an impeller 46 at one end thereof. The impeller shaft 44 is mounted by suitable mounting means 48 to the cylindrical housing 50 of the metering apparatus. A lowering rod 52 protrudes upwardly from the housing 50 to provide a convenient means for lowering the metering apparatus 12 into operative position in the flow tube apparatus 10. The housing 50 defines an opening 54 proximate the lowering rod for insertion of electric signal line means (not shown) to a convenient current meter accessory operable by a person standing on the pavement 56 which defines the manhole opening 58.

The upstream edge 60 of the cylindrical housing 50 for the metering apparatus 12 is constructed with a bevel shape (FIG. 6), which in cooperation with the square edge 32 for the cylindrical member 26 of the flow tube apparatus, provides a fluid seal for the equipment.

The downstream end of the impeller shaft 44 is designed for insertion to a channel 62 defined by the end wall gate 22 of the flow tube apparatus 10. The mating of shaft 44 with channel 62 and other means, such as set screw means 48' for the impeller shaft-mounting means 48, are intended to insure the orientation of impeller shaft 44 in a direction parallel to the direction of fluid flow in the sewer system. Also, it may be seen, particularly in FIG. 5 that a bearing support 44' for the impeller shaft 44 is provided in the end wall gate 22 in the channel 62.

In order to more clearly describe apparatus according to the present invention, a sequence of operations for taking a flow rate measurement will now be described. It is presumed that in most cases, the flow tube apparatus 10 will be in place at all manhole locations before the operator of a measuring device according to the present invention reaches that station to take a measurement. Therefore, the operator, upon reaching the station, removes the manhole cover 57 from the manhole opening 58 and then proceeds to lower the gate 22 into a position as shown in FIG. 3 by use of lifting means 24 in order to provide full pipe flow. Of course, before the operator's arrival at the manhole station, the gate 22 is in an open channel flow position as shown in FIG. 2. After lowering the gate 22, the operator, having the metering apparatus 12 with him, grasps the lowering rod 52 of the metering apparatus 12 and lowers it into position in the flow tube apparatus 10. As he lowers the metering apparatus into position, he guides the metering apparatus 12 so that the downstream end of shaft 44 slides into position guided by the channel 62 until the shaft 44 lines up with bearing support 44' in the gate 22. The upstream end of the housing 50 for the metering apparatus 12 will then line up with the squared edge 32 of the cylindrical member 26. As shown in FIG. 6, the resulting meeting of housing 50 and cylindrical member 26 produces a fluid seal therebetween. Since the gate 22 is now in the stream of flow, and stiffener member 42 is in place braced against the manhole housing 40, the open channel flow is converted to full pipe flow (FIGS. 3 and 4) for taking the measurement. Therefore, knowing the full cross-sectional area of housing 50, by reading an appropriate conventional current meter accessory, attached to the impeller metering mechanism through opening 54, a flow rate measurement can be made.

It may be seen, therefore, that installation of a measuring device according to the present invention may be rapidly and easily accomplished with no in-place adjustments necessary and no physical modification of the sewer line required. Furthermore, open channel flow may be immediately restored after the measurement is taken. The metering apparatus is completely portable for use in conjunction with a conventional battery operated current meter and no external power or compressed air is necessary. Accuracy has been found to be greater that 95 percent and unaffected by the grade of the sewer, the velocity of the flow, or the surcharging that might occur with conventional measuring devices.

What is claimed is:

1. A flow meter construction for an invert of a fluid conduit comprising a flow tube apparatus insertable to said invert, a metering apparatus insertable to said flow tube apparatus and removable therefrom without removal of said flow tube apparatus, means in said flow tube apparatus for converting open channel flow in said conduit to full pipe flow and for reconverting full pipe flow to open channel flow without removal of said flow tube apparatus from said fluid conduit and impeller means responsive to said full pipe flow in said metering apparatus for measuring the rate of said full pipe flow.

2. A flow meter construction according to claim 1 wherein said means in said flow tube apparatus comprises a full pipe flow section having a gate rotatably attached at one of its ends and adapted to selectively close said end, a cylindrical member inserted to the other end of said housing and matable with a conduit whose flow is to be measured, said full pipe flow section having its upper half open for insertion of said metering apparatus.

3. The invention according to claim 2 wherein said metering apparatus comprises a generally cylindrical housing and an impeller shaft located centrally thereof, said cylindrical housing and said cylindrical member forming a substantial fluid seal when said metering apparatus is in place in said flow tube apparatus.

4. The invention according to claim 3 wherein means are provided in said metering apparatus for adjusting the orientation of said impeller shaft.

5. The invention according to claim 3 wherein means are provided in said metering apparatus for lowering said metering apparatus into place in said flow tube apparatus.

6. The invention according to claim 2 wherein said gate includes means for guiding said metering apparatus.

* * * * *